(No Model.) 2 Sheets—Sheet 2.
A. B. POOL & J. J. BEALS.
CAR BRAKE.
No. 464,038. Patented Dec. 1, 1891.
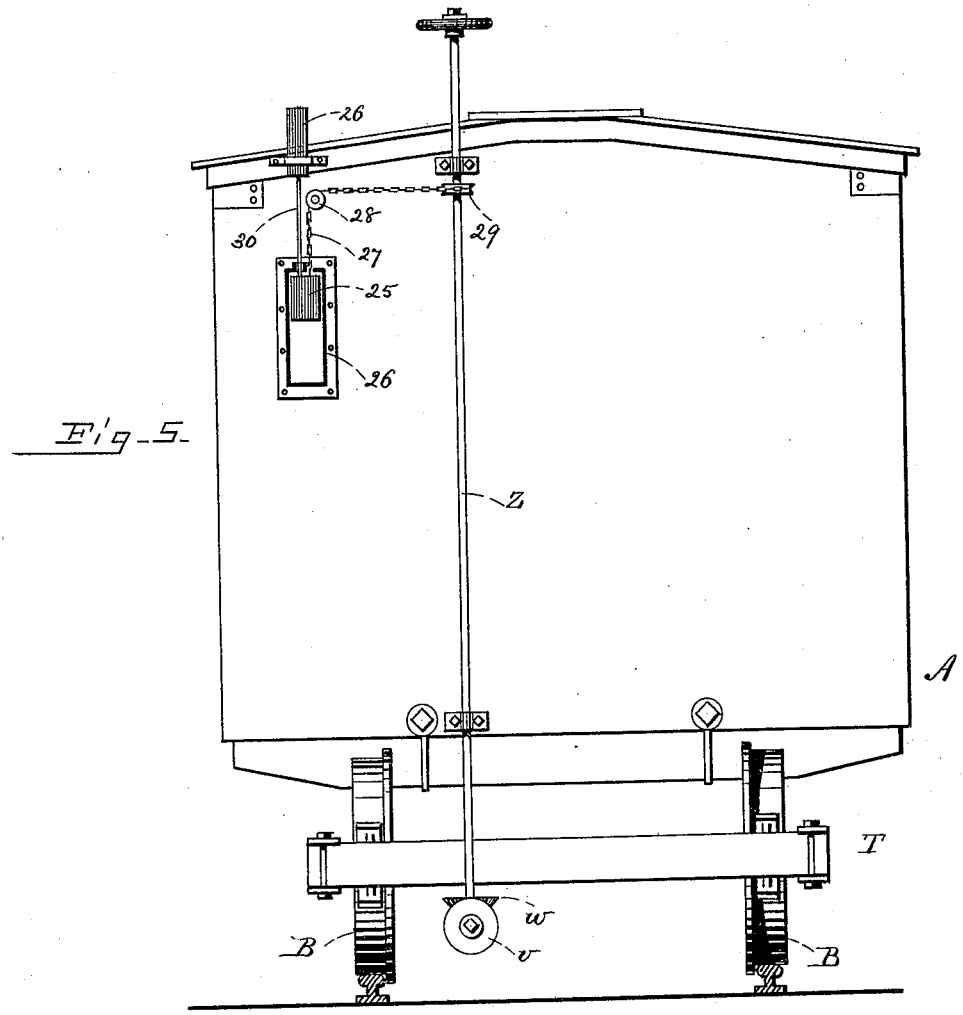

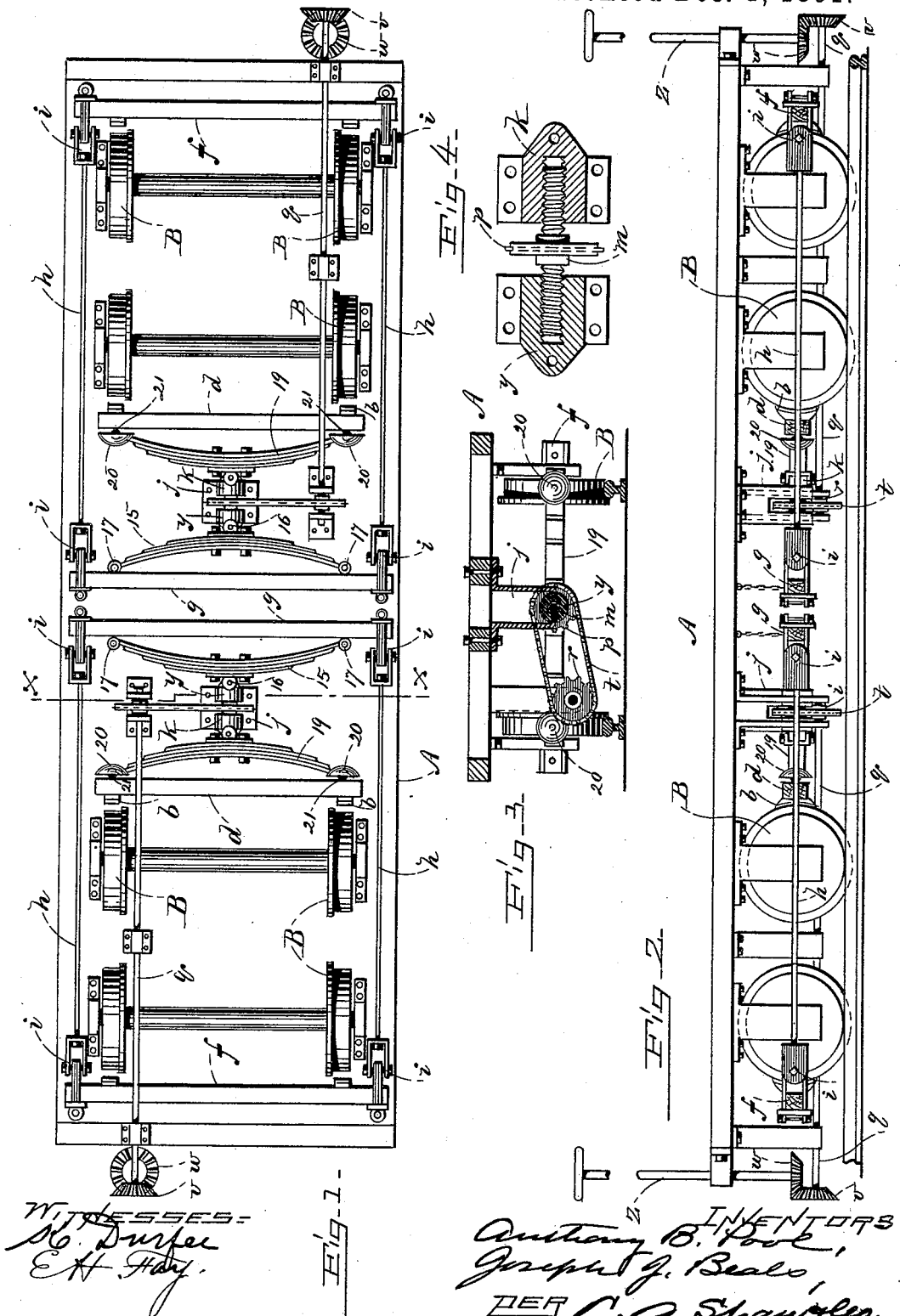

UNITED STATES PATENT OFFICE.

ANTHONY B. POOL AND JOSEPH J. BEALS, OF BOSTON, MASSACHUSETTS.

CAR-BRAKE.

SPECIFICATION forming part of Letters Patent No. 464,038, dated December 1, 1891.

Application filed April 28, 1891. Serial No. 390,793. (No model.)

*To all whom it may concern:*

Be it known that we, ANTHONY B. POOL and JOSEPH J. BEALS, both of Boston, in the county of Suffolk, State of Massachusetts, have invented certain new and useful Improvements in Car-Brakes, of which the following is a description sufficiently full, clear, and exact to enable any person skilled in the art or science to which said invention appertains to make and use the same, reference being had to the accompanying drawings, forming part of this specification, in which—

Figure 1 is a bottom plan view of a car provided with our improved brake mechanism; Fig. 2, a side elevation of the same; Fig. 3, a vertical transverse section taken on line $x\,x$ in Fig. 1; Fig. 4, a sectional view illustrating certain details of construction, and Fig. 5 an end of a car showing the tell-tale or indicator employed with our improved brake.

Like letters and figures of reference indicate corresponding parts in the different figures of the drawings.

Our invention relates, especially, to a brake mechanism which is particularly adapted for use on freight-cars; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the car, and B B the wheels, which are mounted thereon in the usual manner.

Swinging brake-beams $d$ are pendent from the car body or truck and provided with shoes $b$ for engaging the inner wheels B of the trucks. Elongated brake-beams $f$ are pendent from the ends of the cars or the truck and have shoes which engage the outer wheels, said brake-beams being of sufficient length to project beyond the trucks. Between the beams $d$ two similarly-elongated swinging beams $g$ are mounted, said beams being unprovided with shoes. Adjacent beams $f\,g$ are connected at their ends by rods $h$, universal coupling $i$ connecting the ends of said rods with the respective beams. The rods $h$ are disposed outside the wheels B.

Two hangers $j$ are pendent from the car-bottom respectively between each set of beams $d\,g$. In said hangers interiorly-threaded blocks or nuts $y\,k$ are fitted to slide longitudinally of the car. A right-and-left-hand worm $m$ is mounted to work in said nuts and bears a centrally-disposed sprocket-wheel $p$.

Rods $q$ are journaled on the car, each rod being provided at its inner end with a sprocket-wheel $r$, connected by a jack-chain $t$, respectively, with the sprockets of said worms. The outer end of each rod $q$ bears a beveled gear $v$.

The brake-rods $z$ are mounted on the car in the usual manner and are provided at their lower ends, respectively, with beveled gears $w$, meshing into the corresponding gears $v$. Each nut $y$ has a semi-elliptical spring 15, hinged or pivoted centrally at 16 to its outer end, the ends of said spring being provided with rollers 17, which bear against the beams $g$. Each nut $k$ has a similarly-arranged semi-elliptical spring 19, pivoted to its outer end, the ends of said spring being provided with a ball-socket 20, in which balls 21 are disposed, said balls bearing against the brake-beams $d$.

On the end of the car-body A (see Fig. 5) a weight 25 is fitted to slide in a box 26. A chain or guard 27, secured to said weight, passes over a pulley 28 on the car-body and is adapted to be wound on a pulley 29 on the brake-rod $z$. A vertical rod 30 is secured to the weight 25 and bears a signal-plate 26. This signal-plate may be graduated with a scale, as desired.

In the use of our improvement, when the rod $z$ at either end of the car is rotated, the corresponding worm is driven thereby, spreading the nuts $k\,y$. A nut $y$ forces its spring 15 against the beam $g$, drawing the corresponding beam $f$ forward toward the adjacent wheels B and forcing its shoes into contact therewith. Simultaneously the nut $k$ drives its spring 19 against the brake-beam $d$, forcing the shoes $b$ into contact with the adjacent wheels B. All the wheels of one of the trucks are thereby checked at the same time. By pivoting the springs 15 and 19 to their respective nuts and by means of the ball-bearings on the end of said spring relieving the friction, all strain resulting while the car is passing a curve and the corresponding change of position on the truck in relation to the car-body is compensated for. As the rod $g$ is rotated, the chain 27 is wound on the pulley 29, forcing the signal 26 vertically upward above the car-top, and when said rod is reciprocated to release the brake the weight 25 will return said signal. The sprockets and beveled gears obviate the necessity of employing a dog to hold the brake-rod $z$ in position.

The signal 26 indicates at once to the brakeman or engineer should any brakes be set. When it is desired to start the train by providing said signal with a graduated scale, the brakeman may at once ascertain the position of the brake, whether tightly set or partially off, thus determining at once the distance necessary to rotate the brake-rod to effect either result. When the worms $m$ are rotated in the direction opposite that in setting the brakes, each set of nuts $k\ y$ are caused to travel inward or toward each other, and the brake-rods thus released fall readily away from the wheels. The universal joints $i$ permit the rods $h$ to play, so that the action of the device is not interfered with while passing curves.

Having thus explained our invention, what we claim is—

1. In a car-brake, an elongated brake-beam pendent from the car body or truck, rods connecting said brake-beam with a supplemental beam pendent centrally from the car-body, in combination with a worm rotatable from said body and connecting mechanism for spreading adjacent beams, substantially as described.

2. In a car-brake, a worm and means for actuating the same from the car-body, in combination with a nut fitted to travel on said worm, a semi-elliptical spring pivoted to said nut, and balls mounted in sockets on the spring ends in position to engage the brake-beam, substantially as described.

3. In a car-brake, a supplemental beam, as $g$, and an elongated brake-beam, as $f$, connected by rods, in combination with a worm and actuating mechanism, a nut on said worm, and a spring hinged to said nut and bearing against said supplemental beam, substantially as described.

4. In a car-brake, a centrally-pivoted half-elliptical spring having its ends bearing against the car-brake beam and mechanism for forcing said spring against said beam, substantially as described.

5. In a car-brake, a right and left worm and actuating mechanism, in combination with nuts traveling on said worm, a swinging beam on the car connected with the brake-beam, elliptic springs pivoted to said nuts and bearing, respectively, against said swinging beam and the adjacent brake-beam, substantially as described.

6. In a car-brake, a signal-plate fitted to be projected from the car-body, in combination with a brake-rod and mechanism connecting said plate and rod, whereby the plate may be actuated as said rod is rotated, substantially as described.

7. In a car-brake, the weighted signal 26, fitted to slide on the car end, in combination with the brake-rod $z$ and chain or cord 27, connecting said plate and rod, substantially as described.

8. In a car-brake, a rotary rod geared to the car-brake rod and bearing a sprocket-wheel, a worm bearing a sprocket-wheel connected with the rod-sprocket, a nut on said worm, and a semi-elliptic spring pivoted centrally to said nut and having its free end engaging the car-brake beam, substantially as described.

9. In a car-brake, a right and left worm and actuating mechanism connecting with the car-brake rod, in combination with a swinging beam, swiveled rods connecting said beam with a brake-beam at the outer end of the car, nuts fitted to travel on said worm, and half-elliptic springs pivoted on said nuts and bearing, respectively, against said swinging beam and an adjacent brake-beam, substantially as described.

10. In a car-brake, the beam $d$, in combination with the pivoted spring 19 and actuating mechanism, and anti-friction devices on the ends of said spring, substantially as described.

ANTHONY B. POOL.
JOSEPH J. BEALS.

Witnesses:
O. M. SHAW,
K. DURFEE.